Aug. 21, 1951     P. E. CAVANAGH     2,564,777
DEVICE FOR TESTING FERROUS METALS
Filed Sept. 19, 1946
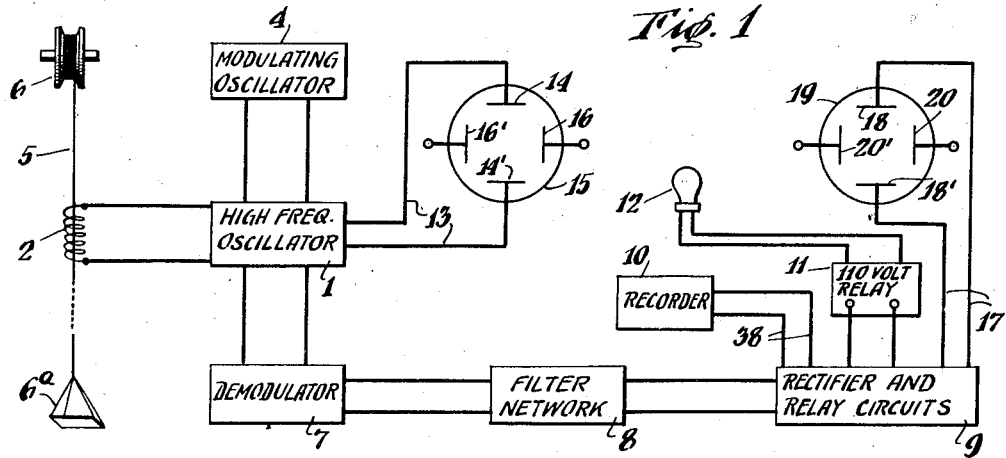
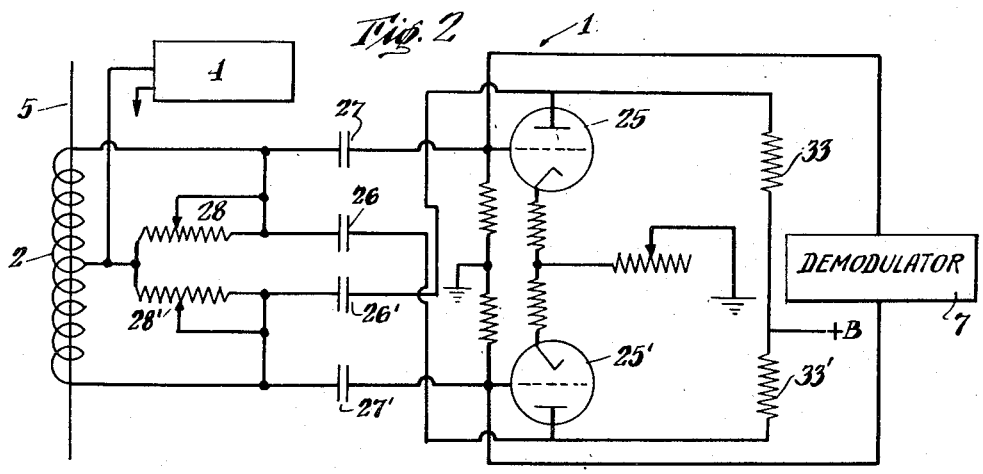
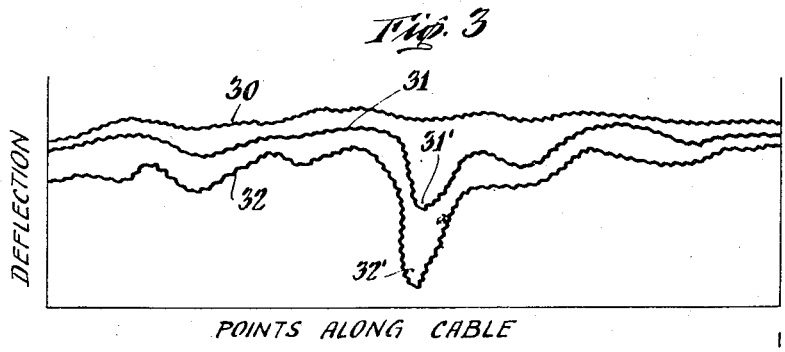
INVENTOR
Patrick Edgar Cavanagh
BY
Charles W. Mortimer
ATTORNEY Patented Aug. 21, 1951

2,564,777

UNITED STATES PATENT OFFICE 2,564,777

DEVICE FOR TESTING FERROUS METALS

Patrick Edgar Cavanagh, Oakville, Ontario, Canada, assignor to Allen B. Du Mont Laboratories, Inc., Passaic, N. J., a corporation of Delaware Application September 19, 1946, Serial No. 698,062

2 Claims. (Cl. 175—183)

This invention relates to a device for comparing stresses in metals. It is particularly useful for testing cables used in mines but it is not restricted to this use. With this invention wire rope can be tested while it is in service in such a manner that visible or audible signals, or both, are produced and a permanent record can be made thereof so as to detect incipient or developed weak spots, and the weak spots can be accurately located. These tests can be made regardless of conditions of moisture, grease, dirt, and temperature changes.

In carrying out the invention the rope or cable to be tested, is passed longitudinally through a suitable coil of insulated wire, which constitutes the inductance of a high frequency oscillator circuit, which generates a frequency that may for example be between about 1,000 cycles and 100,000 cycles per second. This high frequency is modulated by a comparatively low frequency voltage between about 100 cycles and 500 cycles per second.

It is well known that the effective resistance of a coil of wire carrying alternating current and surrounding a piece of metal depends on several factors, i. e., the D. C. resistance of the wire, an additional resistance component of the wire due to the skin effect which increases with frequency, and a resistive component which represents the losses in the piece of metal due to eddy currents induced therein and losses due to hysteresis. The sum of these last two losses are known as the core loss.

If a piece of metal is placed in the field of a coil in an oscillator circuit, the core loss must be supplied by the oscillator in order for the oscillations to be sustained. If the core losses are not supplied, the oscillations will be quenched or decreased in amplitude, if not entirely stopped. This phenomenon, viz: the higher the losses, the lower the amplitude of oscillations, is utilized in the present invention.

It is also well known that core losses of a piece of metal in an oscillating magnetic field vary in accordance with internal unit stresses, so that if the piece of metal in the field of the coil is a portion of a wire rope or cable under tension such as a hoist cable in a mine, variations in the core losses caused by plastic deformation of the metal preceding ultimate failure will, by means of this invention, cause an indication thereof as a result of the change of the amplitude of the oscillating magnetic field.

The output of the high frequency oscillator is governed by magnetic and eddy current losses in the cable and varies with internal unit stresses in different parts of the cable as it passes through the coil in the tank circuit of this oscillator. This oscillator output may be viewed on a cathode-ray tube screen. This output is also connected to a recorder of the known sort which shows variations in the output which are due to variations in unit stress in different parts of the cable that is being tested. Variations in magnetic properties caused by plastic deformation of the metal preceding ultimate failure also produce the same type of variation in the output, since both decrease the output.

This output is also applied to a relay which may be adjusted to close a switch and sound an alarm when the magnetic and eddy current losses exceed a predetermined amount thus warning where any portion of the cable has become weakened at any particular place or places by the stresses.

With this invention a useful improvement on a standard recorder is provided by causing the chart to reverse when the cable is reversed so that the recorder pen traces the same graph as long as conditions remain constant with the same load and hoisting speed.

The invention may be understood from the description in connection with the accompanying drawings in which:

Fig. 1 is a diagram showing an apparatus carrying out the invention.

Fig. 2 is a diagram showing an oscillator that is used in the device.

Fig. 3 are graphs showing the results of tests on a cable.

In the drawings, reference character 1 indicates a high frequency oscillator in which the coil 2 is in the tank circuit of this oscillator. This oscillator is shown more fully in Fig. 2. A modulating oscillator 4 is provided to modulate the high frequency oscillator 1.

A cable 5 is wound on drum 6 which is journaled in fixing bearings not shown. This cable 5 passes through the coil 2 and carries a car 6a that may be used for lifting ore or personnel and supplies from a mine.

A demodulator 7 is provided for the output of the oscillator 1. A filter 8 is connected to the demodulator 7 and leads extend from this filter to rectifier and relay circuits 9 of the known sort. A recorder 10 of the known sort is provided with a chart which is mechanically driven from the hoist. It is connected to the relay or rectifier circuit of block 9.

The block 11 indicates a relay of known sort which is adapted to connect a current from the relay circuit 9 to the lamp 12 to give a visual warning signal when the output of the oscillator 1 reaches a predetermined value. This relay 11 can also be used in various other useful ways such as for turning on recorder 10 when the signal reaches a position showing danger.

Leads 13 extend from the oscillator 1 to the vertical deflection plates 14, 14' of the cathode-ray tube 15 which is shown diagrammatically and leads from a source of desired frequency are connected to plates 16 and 16' to enable the output from this oscillator to be observed visually.

Leads 17 extend from the filter network 8 to vertical deflection plates 18, 18' of the cathode-ray tube 19. Leads from a source of the desired frequency are connected to the horizontal deflection plates 20, 20' in order to enable the signal applied by leads 17 to be observed. The high frequency oscillator 1 of Fig. 1 is shown more fully in Fig. 2. It is of a well-known sort with provision to adjust its amplitude. This oscillator comprises two vacuum tubes 25, 25' having their plates coupled by condensers 26', 26, respectively, to opposite ends of coil 2 which are coupled by condensers 27, 27' to the grids of tubes 25, 25', respectively. Variable resistances 28, 28' are provided between the grid leads of tubes 25, 25' and the middle of coil 2. The output of the tubes 25, 25' is fed from the grid circuits thereof to the demodulator 7. Plate potential to tubes 25 and 25' is supplied in the usual way from a source +B through load resistors 33 and 33' respectively.

The diagram of Fig. 3 was obtained from the readings of a chart on recorder 10 of Fig. 1. The graphs 30, 31 and 32 were obtained by causing a pen on the recorder 10 to be moved vertically by signals from the rectifier circuit 9 through leads 38 in the known way. Movement of the chart was made proportional to the travel of the cable by a suitable drive from the hoist, not shown. The dips 31' and 32' on the chart show that the stress in the cable at one point became greater on successive runs thus warning of a weak spot therein that was becoming worse.

What is claimed is:

1. A device for testing a metal cable having the characteristic that core losses occur therein when said cable is subjected to magnetic fields produced by alternating current, comprising a high frequency oscillator having an inductance coil connected thereto, said coil being adapted to have said cable passed longitudinally therethrough, a lower frequency oscillator connected to said high frequency oscillator to modulate the alternating current output therefrom at a lower frequency, a demodulator connected to the output of said high frequency oscillator to demodulate said alternating current, and a recorder connected to the output of said demodulator.

2. A device for testing a metal cable having the characteristic that core losses occur therein when said cable is subjected to magnetic fields produced by alternating current, comprising a high frequency oscillator having an inductance coil connected thereto, said coil being adapted to have said cable passed longitudinally therethrough, a lower frequency oscillator connected to said high frequency oscillator to modulate the alternating current output therefrom at a lower frequency, a cathode ray tube having two sets of deflecting plates, one of said sets being connected to the output of said high frequency oscillator, the other of said sets being connected to a source of predetermined desired reference frequency.

PATRICK EDGAR CAVANAGH.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,943,619 | Mudge et al. | Jan. 16, 1934 |
| 2,070,666 | Llewellyn | Feb. 16, 1937 |
| 2,227,505 | Kummerer | Jan. 7, 1941 |
| 2,237,254 | Broekhuysen | Apr. 1, 1941 |
| 2,267,884 | Zuschlag | Dec. 30, 1941 |

OTHER REFERENCES

Electronics, Dec. 1943, pages 156 and 161.